(12) United States Patent
Bronnert

(10) Patent No.: US 8,371,623 B2
(45) Date of Patent: Feb. 12, 2013

(54) CAM CLAMP ASSEMBLY

(76) Inventor: Herve' X. Bronnert, Brookfield, WI (US)

(*) Notice: Subject to any disclaimer, the term of this patent is extended or adjusted under 35 U.S.C. 154(b) by 57 days.

(21) Appl. No.: 12/683,745

(22) Filed: Jan. 7, 2010

(65) Prior Publication Data
US 2011/0163541 A1 Jul. 7, 2011

(51) Int. Cl.
*F16L 23/00* (2006.01)
(52) U.S. Cl. ........................ 285/409; 285/365
(58) Field of Classification Search ............... 285/252, 285/253, 407, 409–411, 365–367, 420
See application file for complete search history.

(56) References Cited

U.S. PATENT DOCUMENTS

| 144,997 | A | * | 11/1873 | Mayall | 285/252 |
|---|---|---|---|---|---|
| 204,770 | A | * | 6/1878 | Smith | 138/99 |
| 207,470 | A | * | 8/1878 | Wolf | 24/270 |
| 533,419 | A | * | 1/1895 | Winkler | 285/253 |
| 1,007,326 | A | * | 10/1911 | Boyd | 285/336 |
| 1,110,011 | A | * | 9/1914 | Schneider | 285/114 |
| 1,162,362 | A | * | 11/1915 | Hyland | 285/409 |
| 1,223,054 | A | * | 4/1917 | Kertesz | 24/270 |
| 1,456,761 | A | * | 5/1923 | Bylund | 285/409 |
| 1,518,479 | A | * | 12/1924 | Brewer | 285/409 |
| 1,646,463 | A | * | 10/1927 | Stokesberry | 285/409 |
| 2,706,648 | A | * | 4/1955 | Gosse | 285/409 |
| 2,725,246 | A | * | 11/1955 | Weinhold | 285/252 |
| 2,752,174 | A | * | 6/1956 | Frost | 285/409 |
| 2,775,806 | A | * | 1/1957 | Love | 24/271 |
| 3,151,895 | A | * | 10/1964 | Ward | 285/197 |
| 3,201,156 | A | * | 8/1965 | Coats | 285/365 |
| 3,705,737 | A | * | 12/1972 | Westerlund et al. | 285/365 |
| 3,828,403 | A | * | 8/1974 | Perrin et al. | 24/270 |
| 3,979,143 | A | * | 9/1976 | Weinhold | 285/243 |
| 4,189,172 | A | * | 2/1980 | Perrin | 285/12 |
| 4,311,248 | A | * | 1/1982 | Westerlund et al. | 277/626 |
| 4,561,678 | A | * | 12/1985 | Kunsman | 285/39 |
| 4,573,717 | A | * | 3/1986 | Peacock | 285/365 |
| 4,639,979 | A | * | 2/1987 | Polson | 482/107 |
| 4,643,460 | A | * | 2/1987 | Lieberg | 285/112 |
| 4,660,869 | A | * | 4/1987 | Gabus | 285/365 |

(Continued)

FOREIGN PATENT DOCUMENTS
CH 615988 A5 * 2/1980

OTHER PUBLICATIONS

"The Perfect Surface Hygienic Seal System, Featuring Torque-Rite® and the Perfect Surface Hygienic Seal," Rubber Fab Technologies Group, © 2004-2009, rev. Jun. 2009, 4 pages.

*Primary Examiner* — Aaron Dunwoody
(74) *Attorney, Agent, or Firm* — Rathe Lindenbaum LLP

(57) ABSTRACT

A cam clamp assembly for a sanitary fitting includes a first arcuate segment having a first extension with a slot. A second arcuate segment has a second extension, and the first and second segments are pivotally coupled together for movement about a first axis. An elongated member is pivotally coupled to the second extension for movement of the elongated member about a second axis so that the elongated member is receivable within the slot, the second axis being parallel to the first axis. An offset cam member is pivotally mounted to the elongated member for movement about a third axis, parallel to the first and second axes. A handle rotates the cam member between an open and closed position, and defines a cam travel stop that provides a tactile indication that a predefined compression of the fitting has been obtained when the cam member has been rotated to the closed position.

20 Claims, 5 Drawing Sheets

U.S. PATENT DOCUMENTS

| | | | | |
|---|---|---|---|---|
| 4,924,913 A | * | 5/1990 | Pedersen | 138/155 |
| 4,969,923 A | * | 11/1990 | Reeder et al. | 285/365 |
| 5,351,368 A | * | 10/1994 | Borst | 24/270 |
| 5,380,052 A | * | 1/1995 | Hendrickson | 285/364 |
| 5,988,694 A | * | 11/1999 | Brushaber | 285/81 |
| 6,082,941 A | | 7/2000 | Dupont et al. | |
| 6,672,631 B1 | * | 1/2004 | Weinhold | 285/409 |
| 7,240,930 B2 | * | 7/2007 | Stravitz | 285/419 |
| 7,364,205 B2 | * | 4/2008 | Weinhold | 285/252 |
| 7,828,340 B2 | * | 11/2010 | Heelan et al. | 285/409 |
| 7,931,310 B2 | * | 4/2011 | Lake | 285/365 |
| 7,967,343 B2 | * | 6/2011 | Bortoli | 285/411 |
| 2004/0061335 A1 | * | 4/2004 | Mills | 285/409 |
| 2006/0273589 A1 | * | 12/2006 | Weinhold | 285/409 |
| 2010/0038903 A1 | * | 2/2010 | Linhorst et al. | 285/365 |
| 2011/0101687 A1 | * | 5/2011 | Heelan et al. | 285/409 |

* cited by examiner

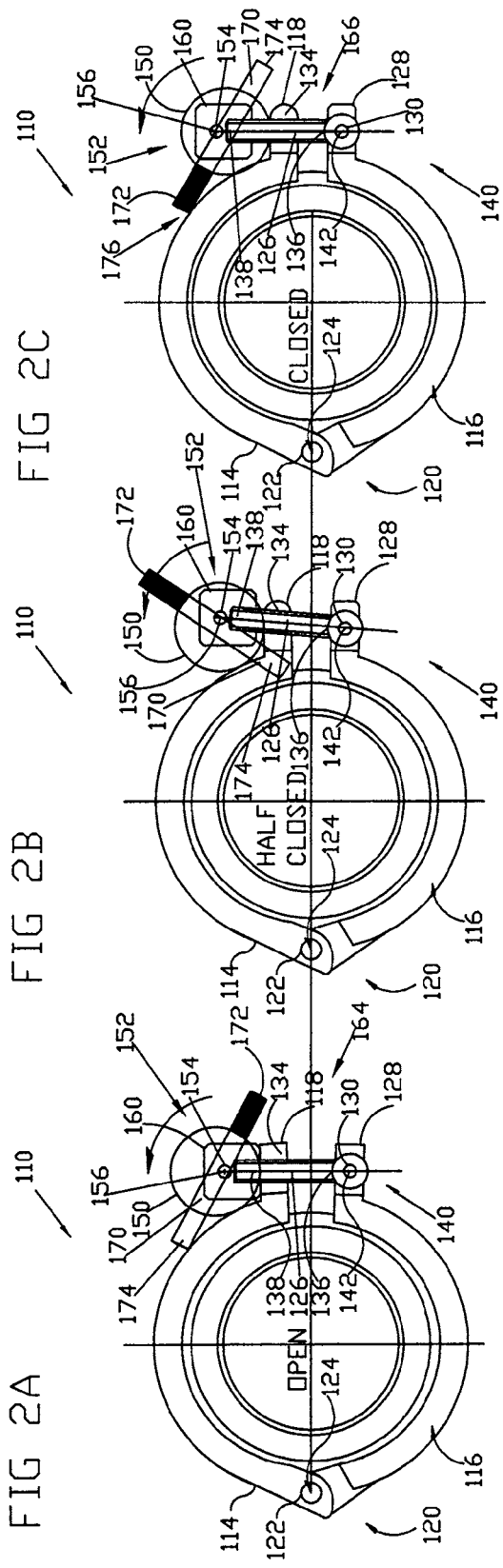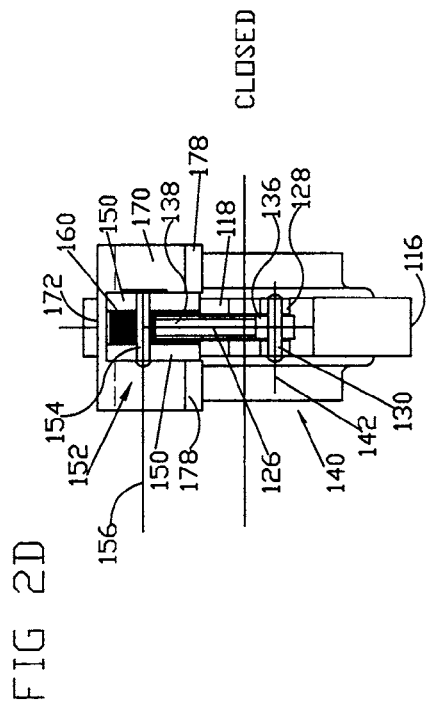

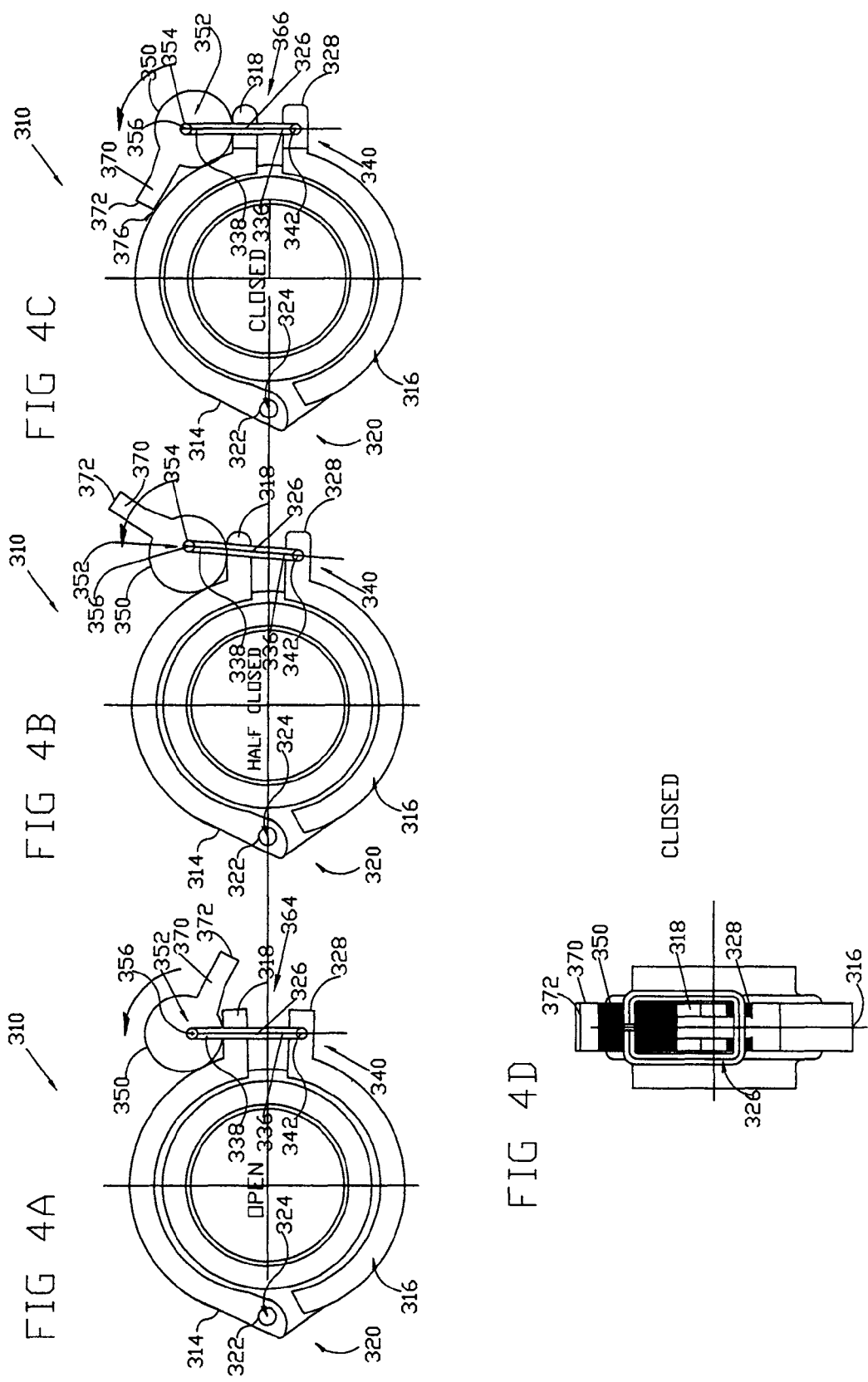

CAM CLAMP ASSEMBLY

FIELD

The present invention relates to a clamp assembly. The present invention relates more particularly to a cam clamp assembly for use in connecting piping and equipment in sanitary systems such as liquid food products and pharmaceuticals. The present invention relates still more particularly to a cam clamp assembly having a cam that is rotatable about an off-center axis by a handle in a progressive wedging interaction to releasably secure the clamp in a manner that provides a predetermined amount of compression.

BACKGROUND

It is well known to provide sanitary fittings for use in processing, manufacturing and/or handling liquid food products and pharmaceutical products. Such sanitary fittings are typically used to connect piping and equipment such as pumps, tanks, filters, valves, heat exchangers, fillers, etc. One example of a typical sanitary fitting includes two ferrules (one each on two adjacent components to be connected), a gasket disposed between the ferrules, and a clamp that fits over the ferrules and is secured around the ferrules. Most clamps in such typical sanitary fittings include a bolt pivotally mounted to a lower half of the clamp by a pin, and a wing nut mounted on the bolt. The bolt is rotated into a slot on the upper half of the clamp and the wing nut is tightened to secure clamp over the ferrules and gasket.

However, such known sanitary fittings have a number of disadvantages. For example, a certain amount of friction usually exists between the wing nut and the bolt, and between the wing nut and the upper half of the clamp as the wing nut is tightened on the bolt. The degree of friction at these two interfaces tends to vary greatly from one application to another, which often results in an inconsistent amount of compression applied by the clamp to the ferrules and gasket. The inconsistent compression often leads to misalignment of the ferrules and/or gasket and leakage at the fitting. Attempts to correct such leakage usually lead to over-tightening the clamp which tends to damage the nut, bolt, gasket and/or clamp and further exacerbate the leakage. Such conventional clamps are also typically time-consuming to install and repair.

Accordingly, it would be desirable to provide a clamp assembly that overcomes the disadvantages of the conventional clamps. It would also be desirable to provide a clamp assembly that is easily and quickly installed and that provides a more consistent amount of compression of the fitting components. It would be further advantageous to provide a clamp assembly having an off-center rotatable cam that provides a progressive wedging interaction with a tactile indication that the desired amount of compression of the fitting components has been achieved.

SUMMARY

One embodiment of the present invention relates to a cam clamp assembly for a sanitary fitting and includes a first arcuate segment having a first extension, the first extension having a slot. A second arcuate segment has a second extension, and the first and second arcuate segments are pivotally coupled together for movement with respect to one another about a first axis. An elongated member has a first end and a second end, where the first end is pivotally coupled to the second extension for movement of the elongated member about a second axis that is parallel to the first axis. A cam member is pivotally mounted to the elongated member in an offset configuration for movement about a third axis, where the third axis is parallel to the first axis and the second axis. A handle is fixed to the cam member to rotate the cam member between an open position and a closed position.

Another embodiment of the present invention relates to a cam clamp assembly for a sanitary fitting and includes a first arcuate segment having a first extension, the first extension having a slot. A second arcuate segment has a second extension, and the first and second arcuate segments are pivotally coupled together for movement with respect to one another about a first axis. An elongated member has a first end and a second end, with the first end pivotally coupled to the second extension for movement of the elongated member about a second axis so that the elongated member is receivable within the slot, and the second axis is parallel to the first axis. A substantially U-shaped member has spaced apart cam members interconnected by a handle, and the cam members are pivotally coupled to the elongated member in an offset configuration for movement about a third axis, where the third axis being substantially parallel to the first axis and the second axis, and the handle is configured to rotate the cam members between an open position and a closed position.

A further embodiment of the present invention relates to a cam clamp assembly for a sanitary fitting and includes a first arcuate segment having a first extension and a second arcuate segment having a second extension. The first and second arcuate segments are pivotally coupled together for movement with respect to one another about a first axis. A link has a first end and a second end, with the first end pivotally coupled to the second extension for movement of the link about a second axis so that the link is positionable above the first extension, and the second axis is parallel to the first axis. A cam member is pivotally mounted to the second end of the link in an offset configuration for movement about a third axis, where the third axis is parallel to the first axis and the second axis. A handle is fixed to the cam member and configured to rotate the cam member between an open position and a closed position.

BRIEF DESCRIPTION OF THE DRAWINGS

FIG. 2A is a schematic diagram of a front elevation view of a cam clamp assembly in an open position, according to an exemplary embodiment.

FIG. 2B is a schematic diagram of a front elevation view of the cam clamp assembly in a half closed position, according to the exemplary embodiment of FIG. 2A.

FIG. 2C is a schematic diagram of a front elevation view of the cam clamp assembly in a closed position, according to the exemplary embodiment of FIG. 2A.

FIG. 2D is a schematic diagram of a partial side elevation view of the cam clamp assembly in a closed position, according to the exemplary embodiment of FIG. 2C.

FIG. 4A is a schematic diagram of a front elevation view of a cam clamp assembly in an open position, according to yet another exemplary embodiment.

FIG. 4B is a schematic diagram of a front elevation view of the cam clamp assembly in a half closed position, according to the exemplary embodiment of FIG. 4A.

FIG. 4C is a schematic diagram of a front elevation view of the cam clamp assembly in a closed position, according to the exemplary embodiment of FIG. 4A.

FIG. 4D is a schematic diagram of a partial side elevation view of the cam clamp assembly in a closed position, according to the exemplary embodiment of FIG. 4C.

DETAILED DESCRIPTION

Referring to the FIGURES, a cam clamp assembly is shown according to several embodiments having a cam that is rotatable about an off-center axis by a handle to releasably secure the clamp in a manner that provides a predetermined amount of compression. The cam clamp assembly is easily and quickly installed and provides a more consistent amount of compression of the fitting components, and has an off-center rotatable cam that provides a tactile indication when the desired amount of compression of the fitting components has been achieved. Although the cam clamp assembly has been shown and described according to the exemplary embodiments for use with sanitary fittings in systems for processing, manufacturing and/or handling liquid food products and pharmaceutical products, the cam clamp assembly may be used in a wide variety of other types of systems for joining tubular components to one another, and may be provided in any of a wide variety of dimensions for use in joining components in a wide variety of sizes.

Figure 1:
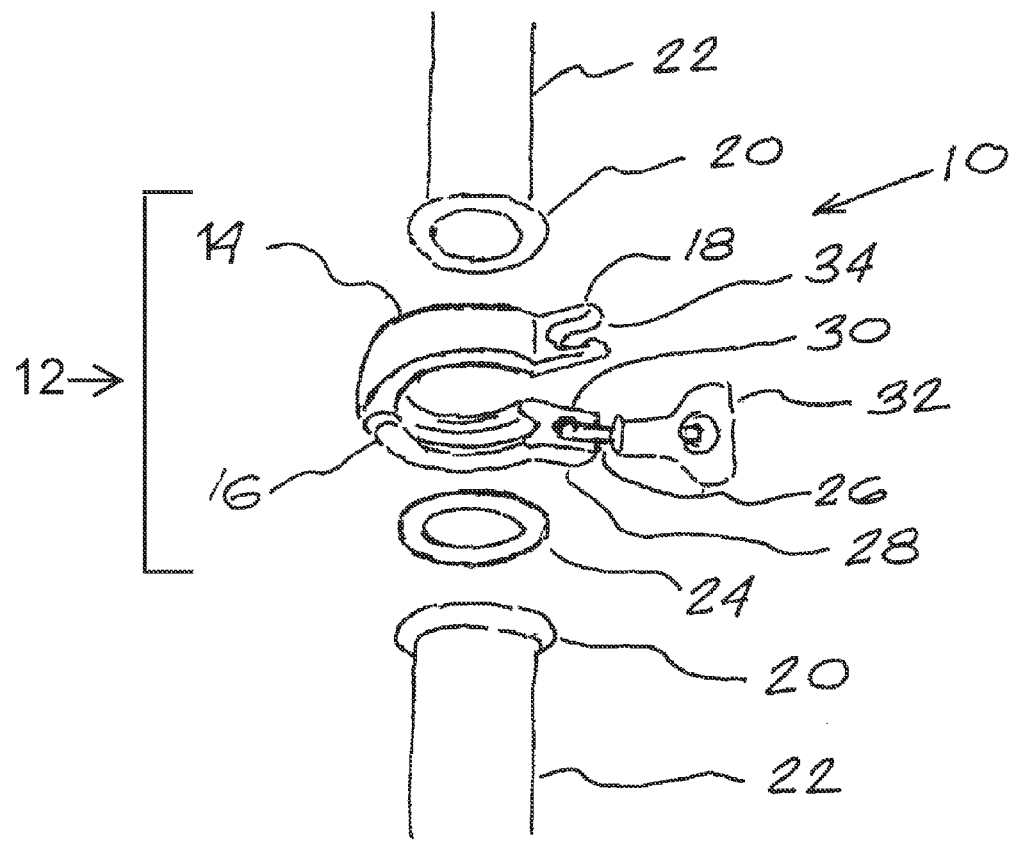
FIG. 1 is a schematic diagram of a prior art sanitary fitting having a clamp.
Figures 3A, 3B, 3C, 3D:
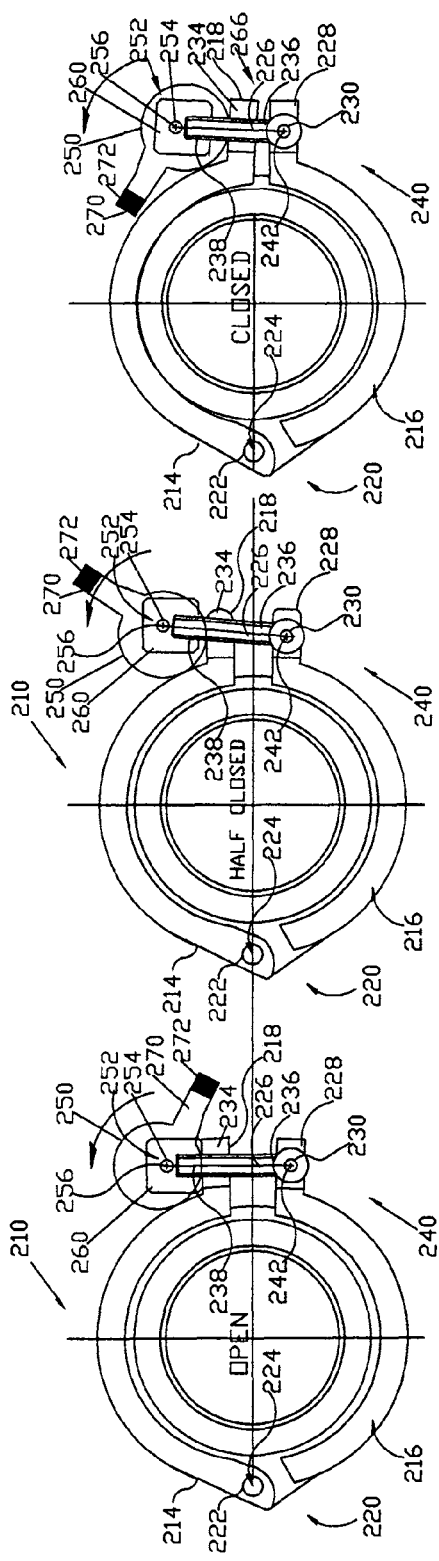
FIG. 3A is a schematic diagram of a front elevation view of a cam clamp assembly in an open position, according to another exemplary embodiment.
FIG. 3B is a schematic diagram of a front elevation view of the cam clamp assembly in a half closed position, according to the exemplary embodiment of FIG. 3A.
FIG. 3C is a schematic diagram of a front elevation view of the cam clamp assembly in a closed position, according to the exemplary embodiment of FIG. 3A.
FIG. 3D is a schematic diagram of a partial side elevation view of the cam clamp assembly in a closed position, according to the exemplary embodiment of FIG. 3C.
Figure 3E:
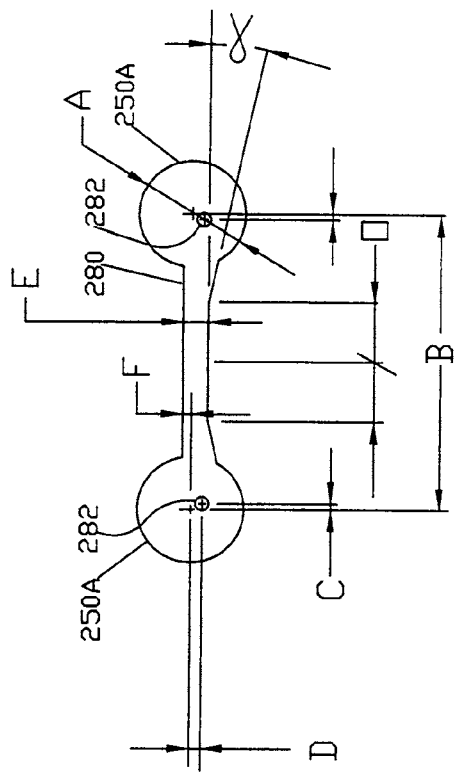
FIG. 3E is a schematic diagram of a top view of a portion of the cam clamp assembly according to the exemplary embodiment of FIG. 3A, in a flat configuration.
Figure 3G:
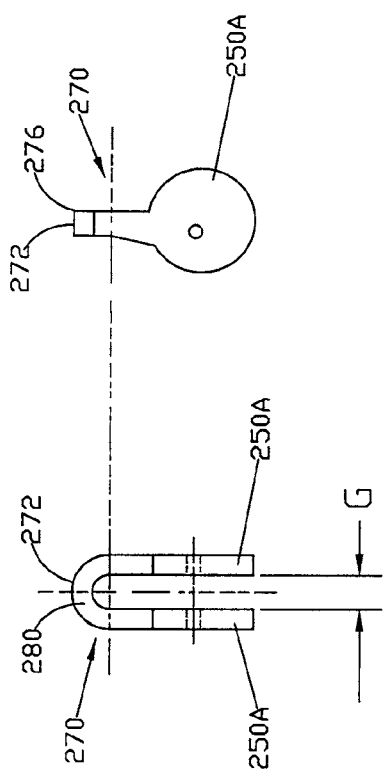
FIG. 3G is a schematic diagram of front elevation view of the portion of the cam clamp assembly according to the embodiment of FIG. 3E, in a bent configuration.
Figure 3F:
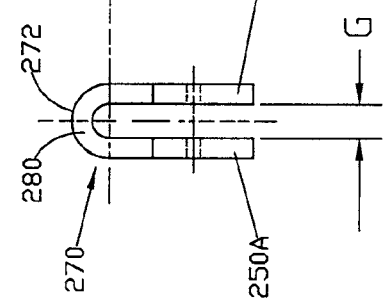
FIG. 3F is a schematic diagram of side elevation view of the portion of the cam clamp assembly according to the embodiment of FIG. 3E, in a bent configuration.

Referring to FIG. 1, a conventional clamp assembly 10 for a sanitary fitting 12 is shown for illustrative purposes. Sanitary fitting 12 includes two ferrules 20 (one each on two adjacent components, shown as pipes or tubes 22, to be connected), a gasket 24 disposed between the ferrules 20, and a clamp assembly 10 that fits over the ferrules 20 and is secured around the ferrules 20. Clamp assembly 10 includes a bolt 26 pivotally mounted to an extension 28 on one segment of the clamp (shown as a lower segment 16 of the clamp) by a pin 30, and a wing nut 32 mounted on the bolt 26. To close the clamp and secure the sanitary fitting, the clamp assembly 10 is opened and the segments (shown as an upper segment 14 and the lower segment 16) are placed about the ferrules 20 and gasket 24 and the upper and lower segments 14, 16 are closed together. The bolt 26 is rotated into a slot 34 on an extension 18 on the upper segment 16 of the clamp assembly 10 and the wing nut 32 is tightened against extension 18 to draw the upper and lower segments 14, 16 together to secure the clamp assembly 10 over the ferrules 20 and gasket 24.

The clamp assembly 10 for sanitary fitting 12 tends to have a number of disadvantages. For example, a certain amount of friction usually exists between the wing nut 32 and the bolt 26, and between the wing nut 32 and the extension 18 on the upper segment 14 of the clamp 10 as the wing nut 32 is tightened on the bolt 26. The degree of friction at these two interfaces tends to vary greatly from one application to another, which often results in an inconsistent amount of compression applied by the clamp assembly 10 to the ferrules 20 and gasket 24. The inconsistent compression often leads to misalignment of the ferrules 20 and/or gasket 24 and leakage at the sanitary fitting 12. Attempts to correct such leakage usually lead to over-tightening the clamp with tends to damage the ferrules, gasket and/or clamp and further exacerbate the leakage. Such clamps are also typically time-consuming to install and repair.

Referring to FIGS. 2A-2D, a cam clamp assembly 110 for a sanitary fitting is shown according to an exemplary embodiment. The cam clamp assembly 110 is shown to include a first arcuate segment 114 having a first extension 118, where the first extension 118 includes an opening 134 (e.g. slot, notch, recess, etc.). A second arcuate segment 116 includes a second extension 128. Together, the arcuate segments 114, 116 define an opening or cavity therebetween for securing components (e.g. ferrules, gaskets, etc.) of a sanitary fitting. The first and second arcuate segments 114, 116 are pivotally coupled together on a first side at a first pivot connection 120 by a pin 122 (or other suitable pivot connection) for movement of the segments 114, 116 with respect to one another about a first axis 124 defined by pin 122. As the first and second segments 114, 116 are moved about the first axis 124, the first and second extensions 118, 128 on an opposite side of the segments 114, 116 are brought toward (or away) from one another so that the segments 114, 116 may be positioned about the sanitary fitting components and then the first and second extensions 118, 128 brought into a close relationship (i.e. generally adjacent to one another).

The cam clamp assembly 110 also includes an elongated member 126 (e.g. bolt, stud, rod, etc.) having a first end 136 and a second end 138. The first end 136 is pivotally coupled to the second extension 128 at a second pivot connection 140 by a pin 130 (or other suitable pivot connection) for movement of the elongated member 126 about a second axis 142 (the second axis 142 being substantially parallel to the first axis 124) defined by the pin 130 so that the elongated member 126 is receivable within the slot 134.

The cam clamp assembly 110 also includes a cam member 150 pivotally coupled to the elongated member 126 in an offset configuration at a third pivot connection 152 by a pin 154 (or other suitable pivot connection) for movement of the cam member 150 about a third axis 156 (the third axis 156 being substantially parallel to the first axis 124 and the second axis 142) defined by the pin 154. The cam clamp assembly 110 may also include a connector 160 configured to pivotally couple the cam member 150 to the elongated member 126. According to one embodiment where the elongated member 126 comprises a threaded portion (in the manner of a bolt or stud or the like), the connector 160 may comprise a nut (such as a square nut, or other suitable threaded member) having the pin 154 that pivotally mounts the cam member 150 by threaded engagement to the elongated member 126.

According to one embodiment, the cam member 150 comprises a pair of substantially circular (or partially circular discs) that are axially aligned and disposed on opposite sides of the connector 160. A handle 170 (e.g. lever, tab, extension, etc.) is shown fixed to the cam member 150 and is configured to rotate the cam member 150 about the third axis 156 between an open position 164 and a closed position 166. The handle 170 is shown to include a first end 172 and a second end 174, where the first end 172 defines a cam travel stop 176 that provides a tactile and/or audible indication (e.g. click, etc.) that a predefined compression of the first and second segments 114, 116 about the sanitary fitting components has been obtained when the cam member 150 has been rotated to the closed position 166 (see FIG. 2C).

The predefined compression of the sanitary fitting components is intended to create a force sufficient to seal the fitting components to one another, without creating excessive force that might tend to misalign or damage the fitting components. The predefined compression is established by the degree of offset of the cam member 150 to the third axis 156. According to one embodiment, the degree of offset of the cam member 150 provides a closing travel of within a range of approximately 0.250-0.375 inches between the first and second extensions 118, 128 as the handle 170 is moved from the open position 164 (see FIG. 2A) to the closed position 166 (see FIG. 2C) (however, the degree of offset may provide any suitable amount of closing travel necessary to obtain a desired compression of the fitting components). According to one embodiment, the rotational travel of the cam member 150 and handle 170 between the open position 164 and the closed position 166 is approximately 180 degrees (although other ranges of travel may be used to suit a particular application). The rotation of a circular (or substantially circular) and offset cam member is intended to create a progressive wedging interaction against the upper surface of extension 118 and first arcuate segment 114, in which a relatively small amount of force applied to the handle is capable of generating a smoothly and progressively increasing force ratio of up to 20-to-1 or more, which leads to a substantially greater force for closing the clamp. As the cam member 150 and handle 172 approach the closed position 166, the closing force on the clamp is even greater due to the offset positioning of the cam. At the end of the rotation of the cam member 150, the handle 172 is stopped at, and retained against, the cam travel stop 176 by contact with first arcuate segment 114.

The second end 174 of the handle 170 includes at least one projection (shown for example as two projections 178) disposed opposite the first end 172. Projections 178 are intended to permit a user to obtain the necessary leverage by hand (i.e. without the use of tools) to rotate cam member 150 about the third axis 156 to the closed position 166 where the tactile and/or audible indication is received when the first end 172 contacts the upper segment 114 at the travel stop 176 as the handle 170 is moved from the open position 164 to the closed position 166. According to the illustrated embodiment, the cam member 150 and handle 170 are configured to rotate in a counterclockwise direction so that the first end 172 of the handle 170 contacts the first segment 114 (to provide the tactile and/or audible indication) and to act as a travel stop 176 to prevent over tightening of the fitting components. The position of the first end 172 of handle 170 against the first segment 114 in the closed position 166 (see FIG. 2C) is also intended to minimize the likelihood that the cam clamp assembly 110 could be inadvertently loosened by unintentional or inadvertent contact. When two projections 178 are provided, a gap or space may be provided between the projections 178 so that the handle 170 clears the upper segment 114 as the handle 170 is rotated from the open position 164 to the closed position 166 (i.e. the projections 178 rotate at least partially about the upper segment 114). According to other embodiments, a single projection may be provided that is offset to one side of the cam clamp assembly so that it does not interfere with the upper segment as the handle is rotated.

Referring to FIGS. 3A-3G, a cam clamp assembly 210 for a sanitary fitting is shown according to another exemplary embodiment. The cam clamp assembly 210 is shown to include a first arcuate segment 214 having a first extension 218, where the first extension 218 includes an opening 234 (e.g. slot, notch, recess, etc.). A second arcuate segment 216 includes a second extension 228. Together, the arcuate segments 214, 216 define an opening or cavity therebetween for securing components (e.g. ferrules, gaskets, etc.) of a sanitary fitting. The first and second arcuate segments 214, 216 are pivotally coupled together on a first side at a first pivot connection 220 by a pin 222 (or other suitable pivot connection) for movement of the segments with respect to one another about a first axis 224 defined by pin 222. As the first and second segments 214, 216 are moved about the first axis 224, the first and second extensions 218, 228 on an opposite side of the segments 214, 216 are brought toward (or away) from one another so that the segments 214, 216 may be positioned about the sanitary fitting components and then the first and second extensions 218, 228 brought into a close relationship (i.e. generally adjacent to one another).

The cam clamp assembly 210 also includes an elongated member 226 (e.g. bolt, stud, rod, etc.) having a first end 236 and a second end 238. The first end 236 is pivotally coupled to the second extension 228 at a second pivot connection 240 by a pin 230 (or other suitable pivot connection) for movement of the elongated member 226 about a second axis 242 (the second axis 242 being substantially parallel to the first axis 224) defined by the pin 230 so that the elongated member 226 is receivable within the slot 234.

The cam clamp assembly 210 also includes a cam member 250 pivotally coupled to the elongated member 226 in an offset configuration at a third pivot connection 252 by a pin 254 (or other suitable pivot connection) for movement of the cam member 250 about a third axis 256 (the third axis 256 being substantially parallel to the first axis 224 and the second axis 242) defined by the pin 254. The cam clamp assembly 210 may also include a connector 260 configured to pivotally couple the cam member 250 to the elongated member 260. According to one embodiment where the elongated member 226 comprises a threaded portion (in the manner of a bolt or stud or the like), the connector 260 may comprise a nut (such as a square nut, or other suitable threaded member) that is positioned and then fixed upon upper end 238 of elongated member 226. The nut includes the pin 254 that pivotally mounts the cam member 250 via the fixed nut (260) to the elongated member 226. Use of a square nut for connector 60 permits the sides of the square nut (see FIG. 3D) to guide the cam member for rotation about third axis 256 and in continuous engagement with the an upper surface of the first arcuate segment 214 and first extension 218.

According to the illustrated embodiment, the cam member 250 comprises a pair of substantially circular (or partially circular discs) that are axially aligned and disposed on opposite sides of the connector 260. A handle 270 (e.g. lever, tab, extension, etc.) is shown integrally formed with the cam member 250 to provide a one-piece, twin-cam member, where handle 270 is configured to rotate the cam member 250 about the third axis 256 between an open position 264 and a closed position 266. As shown more particularly in FIGS. 3E-3G, the cam member 250 and handle 270 are integrally formed as a single member by bending a substantially symmetrical flat member into a U-shaped element having two axially aligned discs 250A spaced from one another by handle portion 280. The handle 270 is shown to include an end 272 that defines a cam travel stop 276 that provides a tactile and/or audible indication (e.g. click, etc.) that a predefined compression of the first and segments 214, 216 about the sanitary fitting components has been obtained when the cam member 250 has been rotated to the closed position 266.

According to one embodiment, the rotational travel of the integrated cam member 250 and handle 270 between the open position 264 and the closed position 266 is approximately 180 degrees (although other ranges of travel may be used to suit a particular application). As the twin cam discs 250A are rotated between the open position 264 and the closed position 266, discs 250A rotate in continuous sliding contact against the top surface of both first extension 228 and first arcuate segment 214 and are guided by the sides of square nut 260. As the cam member 250 rotates, elongated member 226 pivots about second pivot point 240 and is guided by slot 234.

The predefined compression of the sanitary fitting components is intended to create a force sufficient to seal the fitting components to one another, without creating excessive force that might tend to misalign or damage the fitting components. The predefined compression is established by the degree of offset of the cam member 250 to the third axis 256. According to one embodiment, the degree of offset of the cam member 250 provides a closing travel of within a range of approximately 0.250-0.375 inches between the first and second extensions 218, 228 as the handle 270 is moved from the open position 264 (see FIG. 3A) to the closed position 266 (see FIG. 3C) (however, the degree of offset may provide any suitable amount of closing travel necessary to obtain a desired compression of the fitting components). The rotation of a circular (or substantially circular) and offset cam member is intended to create a progressive wedging interaction against the upper surface of extension 218 and first arcuate segment 214, in which a relatively small amount of force applied to the handle is capable of generating a smoothly and progressively increasing force ratio of up to 40-to-1 or more, which leads to a substantially greater force for closing the clamp. As the cam member 250 and handle 272 approach the closed position 266, the closing force on the clamp is even greater due to the offset positioning of the cam. At the end of the rotation of the cam member 250, the handle 272 is stopped at, and retained against, the cam travel stop 276 by contact with first arcuate segment 214. According to alternative embodiments, the cam members may include certain non-circular elements, such as flats (to provide an initial clearance in the open position) and extensions (e.g. bumps, bulges, etc.) to provide additional closing motion (when moving the handle to the closed position).

Referring to FIGS. 4A-4D, a cam clamp assembly 310 for a sanitary fitting is shown according to an exemplary embodiment. The cam clamp assembly 310 is shown to include a first arcuate segment 314 having a first extension 318 and a second arcuate segment 316 having a second extension 328. Together, the arcuate segments define an opening or cavity therebetween for securing components (e.g. ferrules, gaskets, etc.) of a sanitary fitting. The first and second arcuate segments 314, 316 are pivotally coupled together on a first side at a first pivot connection 320 by a pin 322 (or other suitable pivot connection) for movement of the segments 314, 316 with respect to one another about a first axis 324 defined by pin 322. As the first and second segments 314, 316 are moved about the first axis 324, the first and second extensions 318, 328 on an opposite side of the segments 314, 316 are brought toward (or away) from one another so that the segments 314, 316 may be positioned about the sanitary fitting components and then the first and second extensions 318, 328 brought into a close relationship (i.e. generally adjacent to one another).

The cam clamp assembly 310 also includes a link 326 having a first end 336 and a second end 338. The first end 336 is pivotally coupled to the second extension 328 at a second pivot connection 340 for movement of the link 326 about a second axis 342 (the second axis being substantially parallel to the first axis 324) so that the second end 338 of the link 326 is receivable above the first extension 318.

The cam clamp assembly 310 also includes a cam member 350 pivotally coupled to the second end 338 of the link 326 in an offset configuration at a third pivot connection 352 for movement of the cam member 350 about a third axis 356 (the third axis 356 being substantially parallel to the first axis 324 and the second axis 342).

According to one embodiment, the cam member 350 and a handle member 370 are integrally formed as a single member. According to alternative embodiments, the cam member and handle member may be of a type previously described with reference to FIGS. 2A-2D or FIGS. 3A-3G. Handle 370 (e.g. lever, tab, extension, etc.) is configured to rotate the cam member 350 about the third axis 356 between an open position 364 (see FIG. 4A) and a closed position 366 (see FIG. 4C). According to one embodiment, the rotational travel of the integrated cam member 350 and handle 370 between the open position 364 and the closed position 366 is approximately 180 degrees (although other ranges of travel may be used to suit a particular application). The handle 370 is shown to include an end 372 defining a cam travel stop 376 that provides a tactile and/or audible indication (e.g. click, etc.) that a predefined compression of the first and second segments 314, 316 about the sanitary fitting components has been obtained when the cam member 350 has been rotated to the closed position 366 by handle 370 (see FIG. 4C).

The predefined compression of the sanitary fitting components is intended to create a force sufficient to seal the fitting components to one another, without creating excessive force that might tend to misalign or damage the fitting components. The predefined compression is established by the degree of offset of the cam member 350 to the third axis 356. According to one embodiment, the degree of offset of the cam member 350 provides a closing travel of within a range of approximately 0.250-0.375 inches between the first and second extensions 318, 328 as the handle 370 is moved from the open position 364 to the closed position 366 (however, the degree of offset may provide any suitable amount of closing travel necessary to obtain a desired compression of the fitting components).

According to the illustrated embodiment, the cam member 350 and handle 370 are configured to rotate in a counterclockwise direction so that the end 372 of the handle 370 contacts the first segment 314 (to provide the tactile and/or audible indication) and to act as a travel stop 376 to prevent over tightening of the fitting components. The position of the end 372 of handle 370 against the first segment 314 in the closed position 366 is also intended to minimize the likelihood that the cam clamp assembly 310 could be inadvertently loosened by unintentional or inadvertent contact (see FIG. 4C).

According to any exemplary embodiment, a cam clamp assembly for a sanitary fitting includes an offset cam member that is releasably movable onto an outer surface of one segment of the clamp and is rotatable to draw both clamp segments together until a tactile and/or audible indication occurs to create a more consistently applied and predetermined amount of compression of the fitting components.

It is important to note that the construction and arrangement of the elements and embodiments of the cam clamp assembly provided herein are illustrative only. Although only a few exemplary embodiments of the present invention have been described in detail in this disclosure, those skilled in the art who review this disclosure will readily appreciate that many modifications are possible in these embodiments (such as variations in fittings, structures, shapes, dimensions and proportions of the clamp components, use of materials, etc.)

without materially departing from the novel teachings and advantages of the invention. Accordingly, all such modifications are intended to be within the scope of the invention.

The order or sequence of any process or method steps may be varied or re-sequenced according to alternative embodiments. In the claims, any means-plus-function clause is intended to cover the structures described herein as performing the recited function and not only structural equivalents but also equivalent structures. Other substitutions, modifications, changes and omissions may be made in the design, operating configuration and arrangement of the preferred and other exemplary embodiments without departing from the spirit of the inventions as expressed in the appended claims.

What is claimed is:

1. A cam clamp assembly for a sanitary fitting, comprising:
   a first arcuate segment having a first extension including a non-arcuate section, the first extension having a slot;
   a second arcuate segment having a second extension, the first and second arcuate segments pivotally coupled together for movement with respect to one another about a first axis;
   an elongated member having a first end and a second end, the first end pivotally coupled to the second extension for movement of the elongated member about a second axis, the second axis being substantially parallel to the first axis;
   a cam member pivotally mounted to the elongated member in an offset configuration for movement about a third axis, the third axis being substantially parallel to the first axis and the second axis;
   a handle fixed to the cam member and configured to rotate the cam member in continuous sliding contact against both an arcuate portion of the first arcuate section and the non-arcuate section of the first extension between an open position and a closed position.

2. The assembly of claim 1 wherein the cam member is substantially circular.

3. The assembly of claim 1 wherein the elongated member comprises a bolt, and the cam member is coupled to the bolt by a nut, wherein a free end of the bolt is in contact with a bottom portion of a cavity of the nut.

4. The assembly of claim 1 wherein the handle comprises a first end and a second end, the first end defining a cam travel stop that provides a tactile indication that a predefined compression has been obtained when the cam member has been rotated to the closed position.

5. The assembly of claim 4 wherein the second end of the handle comprises at least one projection that moves at least partially about the first segment as the handle is moved from the open position to the closed position.

6. The assembly of claim 4 wherein the first end of the handle remains in contact with the first segment when the handle is in the closed position.

7. The assembly of claim 1 wherein the elongated member is receivable within the slot.

8. The assembly of claim 1 wherein the cam member comprises a pair of discs and the handle is substantially U-shaped and interconnects the pair of discs.

9. The assembly of claim 8 wherein the pair of discs rotate against the first arcuate segment and the first extension in a progressive wedging interaction as the handle is moved from the open position toward the closed position.

10. The assembly of claim 1 wherein the elongated member comprises at least one link configured to fit over the first extension.

11. A cam clamp assembly for a sanitary fitting, comprising:
   a first arcuate segment having a first extension provided with a non-arcuate portion, the first extension having a slot;
   a second arcuate segment having a second extension, the first and second arcuate segments pivotally coupled together for movement with respect to one another about a first axis;
   an elongated member having a first end and a second end, the first end pivotally coupled to the second extension for movement of the elongated member about a second axis so that the elongated member is receivable within the slot, the second axis being substantially parallel to the first axis;
   a substantially U-shaped member having spaced apart cam members interconnected by a handle, the cam members pivotally coupled to the elongated member in an offset configuration for movement about a third axis, the third axis being substantially parallel to the first axis and the second axis;
   wherein the handle is configured to rotate the cam members between an open position and a closed position, the cam members being in continuous sliding contact with both the non-arcuate portion of the first extension and a convex portion of the first arcuate section, as the handle is moved between the open position and closed position.

12. The assembly of claim 11 wherein the cam members are substantially circular and the handle comprises a substantially U-shaped member that connects the cam members in a symmetric relationship.

13. The assembly of claim 11 wherein the elongated member comprises a bolt, and the cam members are pivotally coupled to the bolt by a square nut, and wherein the nut is disposed within a space between the cam members, the square nut having a pair of opposing sides, wherein the cam members are guided by the sides of the square nut as the cam members are pivoted between the open and closed positions.

14. The assembly of claim 11 wherein the handle comprises an end that defines a cam travel stop, the cam travel stop providing a tactile indication that a predefined compression has been obtained when the cam members have been rotated to the closed position.

15. The assembly of claim 11 wherein the handle comprises an angled transition portion adjacent to each of the cam members.

16. The assembly of claim 15 wherein the end of the handle remains in contact with the first segment when the handle is in the closed position.

17. A cam clamp assembly for a sanitary fitting, comprising:
   a first arcuate segment having a first extension;
   a second arcuate segment having a second extension, the first and second arcuate segments pivotally coupled together for movement with respect to one another about a first axis;
   a link having a first end and a second end, the first end pivotally coupled to the second extension for movement of the link about a second axis so that the link is positionable above the first extension, the second axis being substantially parallel to the first axis;
   a square nut being attached to and fixed to the second end of the link, the square nut having two exterior contact surfaces;
   a cam member pivotally mounted to the square nut in an offset configuration for movement about a third axis extending through the square nut, the third axis being substantially parallel to the first axis and the second axis;

a handle fixed to the cam member and configured to rotate the cam member between an open position and a closed position, the cam member being in continuous sliding contact with both the non-arcuate portion of the first extension and a convex portion of the first arcuate section, as the handle is moved between the open position and closed position, the cam portion contacting both the non-arcuate portion of the first extension and the convex portion of the first arcuate section for 180 degrees of rotation of the cam, the cam being guided by the square nut as the cam member moves between the open position and closed position;

the cam being formed of a U-shaped member having two spaced cam members, each cam member having an inner surface facing the other cam member and an opposing outer surface facing away from the other cam member, each inner surface moving relative to and being guided by the respective exterior contact surfaces of the square nut.

18. The assembly of claim 17 wherein the cam member is substantially circular.

19. The assembly of claim 17 wherein the handle comprises an end defining a cam travel stop that provides a tactile indication that a predefined compression has been obtained when the cam member has been rotated to the closed position.

20. The assembly of claim 19 wherein the end of the handle remains in contact with the first segment when the handle is in the closed position.

* * * * *